United States Patent [19]

Korbelak et al.

[11] 4,428,645

[45] Jan. 31, 1984

[54] CABLE ACCUMULATOR

[75] Inventors: Kenneth N. Korbelak, Jackson; Joseph B. Masterson, Carteret, both of N.J.

[73] Assignee: GK Technologies, Incorporated, Greenwich, Conn.

[21] Appl. No.: 332,600

[22] Filed: Dec. 21, 1981

Related U.S. Application Data

[63] Continuation-in-part of Ser. No. 229,192, Jan. 28, 1981.

[51] Int. Cl.³ .............................................. G02B 7/26
[52] U.S. Cl. .................... 350/96.20; 156/502
[58] Field of Search ............. 350/96.20, 96.21, 96.22; 29/464; 156/502

[56] References Cited

U.S. PATENT DOCUMENTS

| | | | |
|---|---|---|---|
| 4,171,867 | 10/1979 | Cocito | 350/96.21 |
| 4,266,853 | 5/1981 | Hutchins et al. | 350/96.20 |
| 4,319,951 | 3/1982 | Korbelak et al. | 156/502 |
| 4,332,435 | 6/1982 | Post | 350/96.20 |
| 4,359,262 | 11/1982 | Dolan | 350/96.20 |
| 4,373,776 | 2/1983 | Purdy | 350/96.20 |

FOREIGN PATENT DOCUMENTS

| | | | |
|---|---|---|---|
| 2914217 | 10/1980 | Fed. Rep. of Germany | 350/96.20 |
| 55-62414 | 5/1980 | Japan | 350/96.20 |
| 55-127507 | 10/1980 | Japan | 350/96.20 |

*Primary Examiner*—John D. Lee
*Attorney, Agent, or Firm*—Hopgood, Calimafde, Kalil, Blaustein & Judlowe

[57] ABSTRACT

For spliced connection of multi-channel optical-fiber cable ends, the invention contemplates provision of a splice case internally adapted for the storage of excess length of cable in an accumulator and near the splice region, there being a splice mount that is removably secured to the accumulator, so that stored excess cable length will permit selective removal of the splice mount and all its fiber splices to a working location remote from the splice case and its accumulator, all without disturbing the continuous communicating connection of splice fibers not requiring service maintenance or repair. When the servicing operation has been completed, the excess cable length is readily re-coiled into the accumulator, the splice mount is returned to its secured position, and the splice case is re-closed.

17 Claims, 5 Drawing Figures

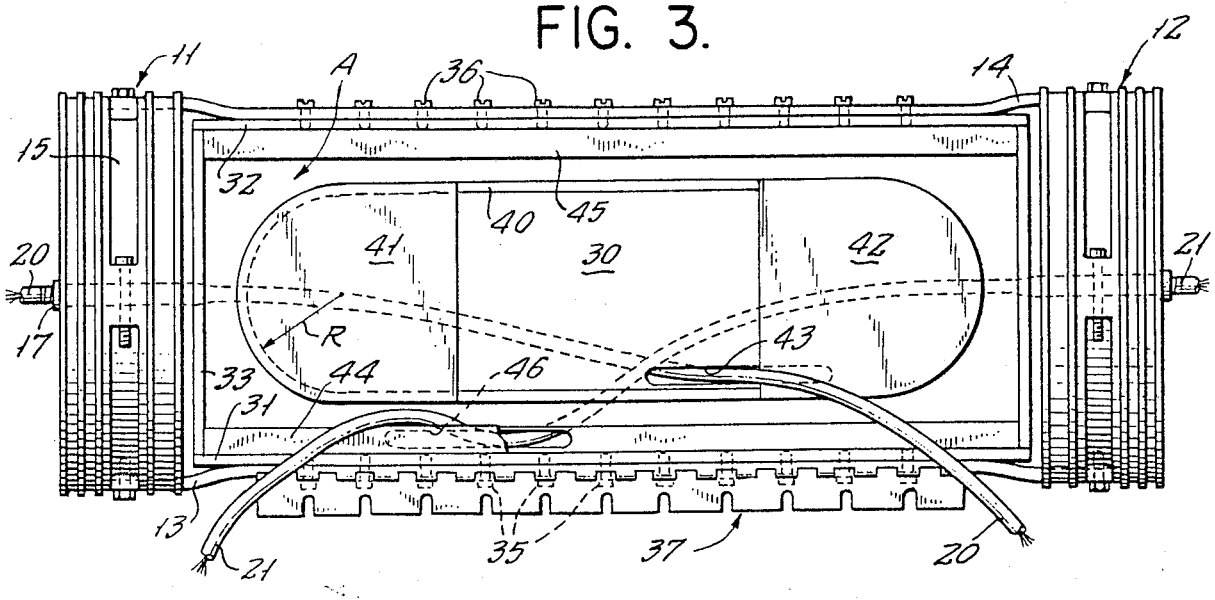

CABLE ACCUMULATOR

BACKGROUND OF THE INVENTION

This application is a continuation-in-part of co-pending application Ser. No. 229,192, filed Jan. 28, 1981.

Communication cables consisting of a plurality of optical fibers are destined for rapidly expanding general use. They enter a field of long use of conductive cables wherein communication channels have relied upon pairs of conductors within the cable. Whatever the nature of the cable, there must be provision for individually splicing all lines at an end of a given length of cable to the corresponding individual lines at the adjacent end of the next-succeeding length of cable, and in wire-communication practice, it is conventional to use a splice case, within which strength members of the cable ends may be anchored and all conductors spliced, wrapped and stored; in the course of wire splicing, it is customary to bend the spliced connections, to make access possible to other connections. However, the brittle nature of glass fibers forecloses adoption of wire-splicing techniques within such a splice case.

A fiber-optic cable comprises a plurality of fine glass fibers which are buffered with a plastic, stranded over a central strength member, and covered by an outer jacket. The right type fiber and a fiber count of 12, within a fiber-optic cable having an outside diameter of 0.300 inch, can replace a wire cable with 225 pairs of conductors; and the latter has an outside diameter of two inches.

As noted above, the fiber-optic cable does not lend itself to the splicing practices of wire communication, in that the individual glass fibers cannot just be bunched, tied, wrapped and shoved into a splice case, in anything like the manner of metallic-wire cables. These small diameter glass fibers cannot be crimped or bent at small angles, without breakage. Glass fibers have memory and always want to return to straight-line orientation, so that placement or winding in a splice case becomes very difficult. Moreover, the splicing operation entailed in interconnection of optical fibers is a precision operation which does not lend itself to performance within a manhole, in a duct, or at pole-suspension elevation.

BRIEF STATEMENT OF THE INVENTION

It is an object of the invention to provide improved means for the safe and efficient storage, accumulation, and mechanical protection of the spliced ends of fiber-optic cable lengths.

It is another object to provide accumulator means for removably accommodating optical-fiber cable of the character indicated within a splice case, whereby such cable may be conveniently spliced and otherwise inspected and maintained, at a location sufficiently remote from the splice case.

It is also an object to provide, in conjunction with such an accumulator, means whereby stored excess length of optical-fiber cable may be used to relocate the splice case, without entailing disconnection of any splices and, therefore, without interruption of normal communication use of the spliced cables.

The invention achieves the foregoing objects and certain other features in an accumulator construction which may be contained within a conventional splice case, wherein substantial excess length of each of the two cables that are spliced is removably stored as an elongate coil of such proportions that the shortest bend radius is within the safe flexure capability of the individual fibers of the cable. The splice region itself is removably mounted to the accumulator, so that stored excess cable length can be removed with the splice mount, to a working location that is favorable to the precision requirements of optical-fiber splicing and inspection. Such removal is performed without disturbing the continuous communicating connection of those spliced fibers which do not require service maintenance or repair. When the servicing operation has been completed, the excess cable length is readily re-coiled into the accumulator, the splice mount is returned to its secured position, and the splice case is re-closed.

Preferably, at each cable entry through an end wall of the splice case, provision is made for sealed, selectively operative clamping of the applicable cable, thus enabling stored excess cable length within the accumulator to make possible an important degree of flexibility in the location or relocation of the splice case with respect to the cable, or of the cable with respect to the splice case, all without interruption of normal communication use of all channels served by the cable.

DETAILED DESCRIPTION

The invention will be described in detail in conjunction with the accompanying drawings, which show, for illustrative purposes only, a preferred embodiment of the invention. In said drawings:

FIG. 3 is a plan view of the accumulator, with the cover element removed;

FIG. 4 is a view in side elevation of the structure of FIG. 1; and

FIG. 5 is a sectional view, taken at 5—5 in FIG. 1.

Figure 1:
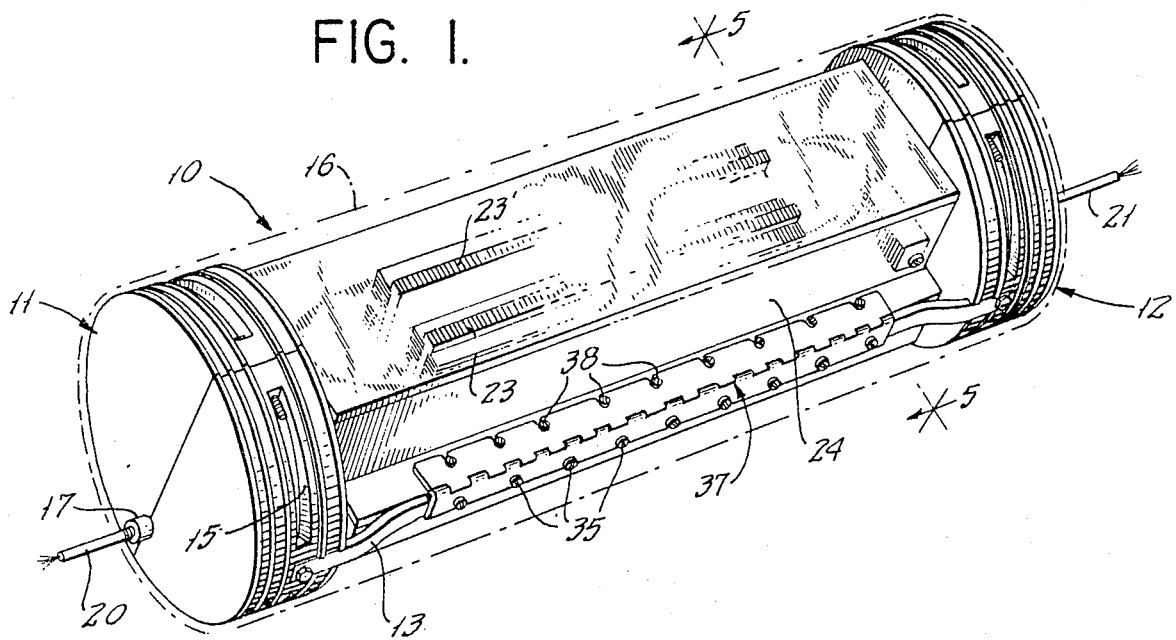
FIG. 1 is a perspective view of a splice case incorporating the accumulator of the invention, with all components in stowed condition, but with its cylindrical casing removed and merely suggested by phantom outline.

The accumulator of the invention and its associated splice mount are illustratively contained within a splice case 10, which may be of a variety currently in use for containment of conventional wire-cable splicings. Thus, case 10 may comprise end-wall members or bulkheads 11-12 of conforming contour, here shown as circular, and rigidly interconnected by parallel elongate conductive tie rods 13-14, at diametrically spaced locations. Each end wall 11 (12) is shown to comprise like semicylindrical halves, circumferentially clamped by a conductive ring 15, to which the respective rods 13-14 are bolted. The conductive members 13-14-15 establish an electrically grounded frame, which is completed upon clamped peripheral assembly of semicylindrical halves of a metal casing, here only suggested by phantom outline 16. Each end wall, such as end wall 11, is formed with a cable-entry port, here shown as mating semicylindrical halves of a bore at the parting line between the clamped end-wall halves. It will be understood that, at each such entry port, means such as an elastomeric bushing 17 located by and within the entry port, may accept longitudinally slidable entry of a fiber-optic cable therein, and that when the circumferential clamp of ring 15 is set, bushing 17 sealingly supports cable passage through the applicable end wall. As shown, a first cable 20 enters the splice case via one end wall (11)

and a second cable 21 similarly enters the splice case via the other end wall (12).

In accordance with a feature of the invention, the cylindrical volume defined by and between end-wall members 11-12 is divided into two substantially semicylindrical volumes, the lower one of which is structured as an accumulator A for the safe and efficient independent storage of excess length of cables 20-21, while the upper volume accommodates not only a removable cover 22 for the accumulator but also desirably mounts an organizer B for the individual spliced fibers of the respective cable ends.

Figure 2:
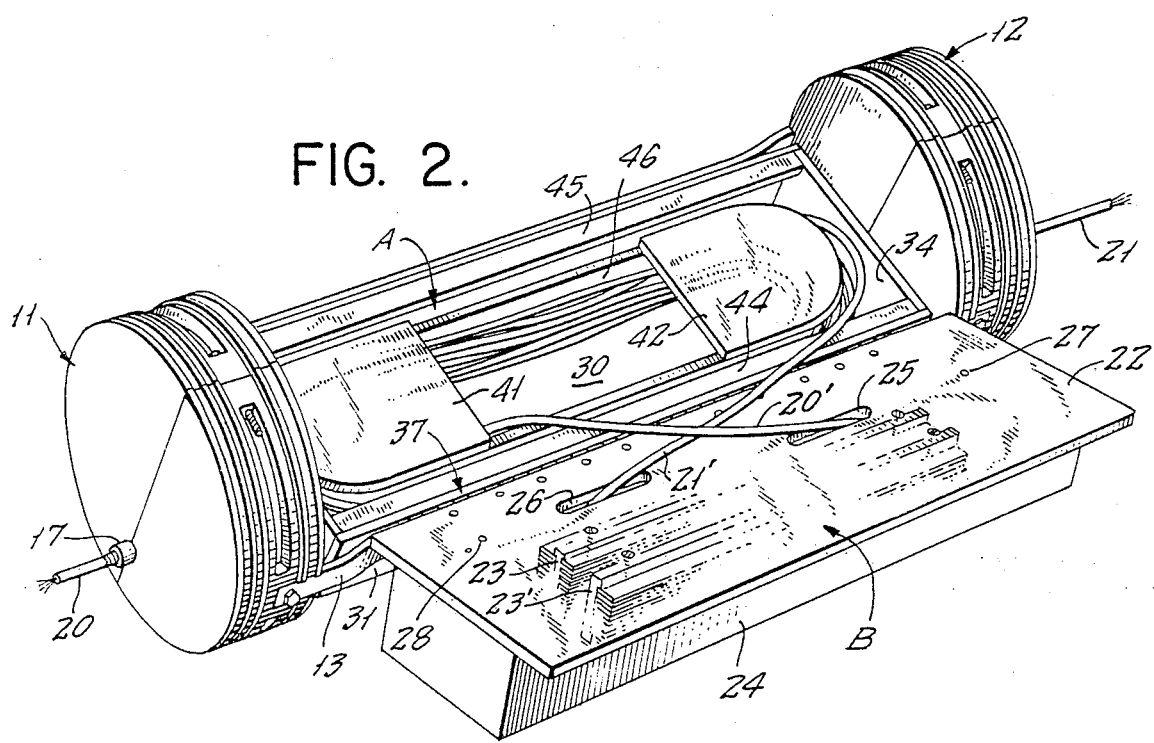
FIG. 2 is a similar view, with a removable cover element articulated to open position, to reveal detail of the accumulator.

The organizer B may be of the nature described in copending application, Ser. No. 145, 009, filed Apr. 29, 1980, (now U.S. Pat. No. 4,319,951) and therefore need not here be described in detail. It suffices to say that cover 22 may be the base for mounting two spaced elongate frames 23-23' of the organizer, that plural elongate channels on outer walls of frames 23-23' are sized for frictional retention of separate spliced fibers, and that a housing 24, removably carried by cover 22, provides protection for the delicate contents of the organizer. As best seen in FIGS. 2 and 3, the spliced end 20' of cable 20 enters the organizer via a first elongate slot 25 in cover 22, and the spliced end 21' of cable 21 enters the organizer via a second such slot 26 in cover 22. It will be understood that clamp and stress-member tie-down connections for each cable end 20'-21' may be made to cover 22, within the organizer housing 24; such tie-down connections may include anchor bolts, at a tapped hole 27 (FIG. 2) for the stress member of cable end 20' and at a tapped hole 28 for the stress member of cable end 21'.

The organizer A is shown as an elongate box-like enclosure having a rectangular bottom panel 30, elongate upstanding side walls 31-32, and end walls 33-34, all fixedly suspended from bolted connections 35-36 of the side walls 31-32 to adjacent tie rods 13-14, and the cable entry bushings 17 being beneath bottom panel 30. The bolts 35 by which side wall 31 is suspended from tie rod 13 also secure one elongated plate of piano-hinge means 37 for articulated connection of the cover 22; the other plate of hinge means 37 is seen in FIG. 3 to be slotted for removable accommodation of hinge bolts 38 having tapped engagement along the adjacent edge of cover 22, whereby cover 22 and its organizer B may be readily removed from hinged connection to side wall 31, merely by slight loosening of bolts 38.

The organizer A further includes a second box-like enclosure within the rectangular enclosure defined by and between the side and end walls 31-32 and 33-34. More specifically, an elongate effectively continuous inner side wall 40 rises from bottom panel, in lateral and end clearance with all of the outer walls 31-32-33-34. Wall 40 is preferably characterized by semicylindrical longitudinal ends, of inner radius R, to which the material of cables 20-21 can readily and safely conform, and wall 40 is characterized by spaced parallel lengths between its semicylindrical ends; for safe accommodation of fiber-optic cabling as presently contemplated, it is preferred that radius R be at least five times the diameter of the involved cable. A retaining permanent cover panel 41 (42) closes the respective semicylindrical ends, except for access via an elongate central upwardly open region between panels 41-42, and an elongate slotted opening 43 (FIG. 3) in the bottom panel 30 provides entry access for cable 20 to an inner accumulator volume defined by and between oval wall 40 and panels 30-41-42. An outer annular accumulator volume is defined laterally by and between oval wall 40 and the outer walls 31-32-33-34, and vertically by and between bottom panel 30 and retaining strips 44-45 along upper edges of side walls 31-32. Strips 44-45 extend laterally inward of their respective side walls 31-32, well short of adjacent elongate stretches of the oval wall 40, to permit ready cable insertion into and removal from the annular accumulator volume; and an elongate slotted opening 46 (FIG. 3) in the bottom panel 30 provides entry access for cable 21 to the outer annular accumulator volume. Preferably, each of the respective cable-entry slotted openings 43-46 is adjacent an outer longitudinal wall of its associated accumulator volume, as shown.

In use, a predetermined excess length of each of the cables 20-21 is independently accommodated by coiled ready-access storage in the respective inner and outer accumulator volumes; such excess length may typically be 50 to 100 feet at the end of each of the two cables, and the span between end walls 33-34 being typically two feet. Thus, some 12 to 20 coiled turns of cable 21 may be nested and self-retaining within the outer accumulator volume, and an even larger number of coiled turns of cable 20 may be nested and self-retaining within the inner accumulator volume. In both cases reliance is placed on the memory characteristic of optical fibers within the cables, to make the cables resiliently contact confining limits of the respective accumulator volumes; in the case of the oval inner volume, cable 20 resiliently hugs the inner contour of wall 40, and in the case of the outer annular volume, cable 21 obtains similar support from side walls 31-32, but essentially only central tangential-contact support from end walls 33-34. The free ends 20'-21' of the accumulator-stored cabling issue from the respective coils on generally longitudinally extending alignments, close to the hinge axis of means 37 and aligned for direct entry to the splice organizer B via the cover openings 25-26. Of course, the splice case 10, with its stored and spliced cable cabling, is permanently closed and sealed by its housing 16 when in normal service use.

To perform a maintenance, inspection or resplicing operation, whatever the installation of the splice case 10, its housing 16 is first removed, to expose contents, having the closed-accumulator appearance of FIGS. 1 and 4. To perform a splicing operation, the hinge bolts 38 are merely loosened, whereupon cover 22 and its organizer B may be raised about the hinge-articulation axis (FIG. 5) and inverted (FIG. 2), making organizer B available for convenient manual grasp and lateral separation from hinge means 37. The stored lengths of cables 20-21 are easily dislodged from their retained confinement by strips 44-45 and cover panels 41-42, respectively, so that the organizer may be carried to a suitable remote location, for performing delicate fusion splicing, testing or the like operations. Importantly, all fibers except the transmission fiber involved in a splicing operation may remain in continuous communication service, in spite of the removal of organizer B and in spite of cable removal from accumulator A. When splicing, testing or the like operations have been completed, the cover 22 with its housed organizer B are easily assembled to the slotted hinge plate, and bolts 38 resecured, the excess lengths of cables 20-21 being coiled as they are returned to their respective accumulator volumes. Cover 22 is then articulated from its FIG. 2 position to its FIG. 1 position, and the splice-case housing 16 resecured.

It will be understood that the stored excess length of each cable is ample to permit the repeated removal and replacement of the organizer, as described and that it provides ample excess length to serve as a source of fresh cable, should a break occur, so that multiple splicing in a given fiber channel can be avoided. Also, it will be understood that the stored excess length of each cable may be sufficient, in conjunction with the releasably clamped nature of bushings 17 through end walls 11-12, to permit relocation of splice case 10 with respect to installed cables 20-21, as by shifting the splice case from access via one manhole to more convenient access via another manhole in the general vicinity of the first manhole.

While the invention has been described in detail for a preferred embodiment, it will be understood that modifications may be made without departure from the scope of the invention.

What is claimed is:

1. In a splice case for containing splices from individual optical fibers of one multichannel fiber-optic cable end to corresponding optical fibers of another multichannel fiber-optic cable end, an accumulator comprising an elongate rectangular housing having a bottom wall and upstanding side and end walls, a cable-locating core including an annular wall fixed to and upstanding from the bottom wall and of elongate oval configuration and spaced from said side and end walls to define with said side and end walls a first oval volume for coiled accumulation of excess length of at least one of said cables near the splice region thereof, said annular wall also defining therewithin an oval second volume for coiled accumulation of excess length of at least the other of said cables near the splice region thereof, said housing including a housing closure removably secured to at least one of said side walls for removable access to accumulated cable within said housing, and splice-supporting means carried by said closure, there being at least one opening in said closure for cable passage from said accumulator to said splice-supporting means.

2. The splice case of claim 1, in which said closure has a removably secured hinge connection to said one side wall.

3. The splice case of claim 1, in which said splice-supporting means is a splice organizer having provision for independent selectively removable support of each individual fiber-to-fiber splice between the respective corresponding fibers of said cable ends.

4. In a splice case for accommodating splices from individual optical fibers of one multichannel fiber-optical cable end to corresponding optical fibers of another multichannel fiber-optic cable end, wherein said case comprises a frame including two end-wall members of like peripheral contour, and two elongate parallel tie rods rigidly connecting said end-wall members in longitudinally spaced relation, the rod connections being at corresponding peripherally spaced locations on said end-wall members, said end-wall members each having an entry port for through-passage of a different one of the cable ends, and an elongate peripheral-wall closure adapted for removable closure of the included frame volume defined by and between said end-wall members, the improvement comprising an elongate rectangular housing supported by said frame and within said volume, said housing comprising a bottom wall of substantially the longitudinal and transverse extent of said volume, side and end walls upstanding from said bottom wall, a cable-locating core fixed to and upstanding from the bottom wall and of elongate oval configuration and spaced from said side and end walls to define an annular storage volume for coiled accumulation of excess length of one of said cables near the splice region thereof, one of said walls having a port for through-passage of one cable from one end-wall port to coiled accumulation within said annular volume, said core defining with said bottom wall a generally oval storage volume for coiled accumulation of excess length of the other of said cables near the splice region thereof, said bottom wall having a port for through-passage of the other cable from the other end-wall port to coiled accumulation within said generally oval volume, a removable closure for said housing and spanning both said annular and generally oval volumes, and splice-supporting means carried by said closure.

5. The splice-case improvement of claim 4, in which each of said end walls includes means establishing a sealed port reception of the cable passing therethrough.

6. The splice-case improvement of claim 5, in which said last-defined means includes means for releasably clamping the cable in sealed relation, whereby the clamped location of each end-wall port to its cable may be selectively varied within a range determined by the cable-storage capacity of its associated cable-storage volume.

7. The splice-case improvement of claim 4, in which said closure has a removably secured hinge connection to one of said side walls and is of substantially the peripheral dimensions of said bottom wall.

8. The splice-case improvement of claim 7, in which said closure is a flat panel having at least one port near the hinge connection for cable passage therethrough, said splice-supporting means being mounted to said panel on the side external to said cable-storage volumes.

9. The splice-case improvement of claim 8, in which said closure further includes a protective housing removably secured to said side panel and defining an enclosure of said splice-supporting means.

10. The splice-case improvement of claim 7, in which the connection of said hinge to said one side wall is also a connection of said one side wall to one of said tie rods.

11. The splice-case improvement of claim 10, in which the other of said side walls is connected to the other of said tie rods.

12. A splice case for accommodating splices from individual optical fibers of one multichannel fiber-optic cable end to corresponding optical fibers of another multichannel fiber-optic cable end, said case comprising two like longitudinally spaced circular end walls, each end wall having an entry port for through-passage of a different one of the cable ends, an accumulator within the included cylindrical volume defined by and between said end walls, said accumulator comprising a rectangular bottom wall extending longitudinally between said end walls and laterally in a generally chordal plane of said cylindrical volume and at offset from the axis of said cylindrical volume, side walls upstanding from the longitudinal sides of said bottom wall and to substantially the extent of said offset, a cable-locating core wall upstanding from the bottom wall to substantially the extent of said offset, said core wall being of elongate oval configuration and spaced from all peripheral limits of said bottom wall to define an annular storage volume for coiled accumulation of excess length of one of said cables between one of said entry ports and the splice region thereof, said core wall defining with said bottom wall a generally oval storage volume for coiled accumulation of excess length of the other of said cables between the other of said entry ports and the splice region thereof, and splice-supporting means within the remaining space of said cylindrical volume and removably secured to said accumulator.

13. The splice case of claim 12, in which two diametrically opposed tie rods rigidly interconnect said end walls, and said accumulator is connected via said side walls to said tie rods.

14. The splice case of claim 12, in which said entry ports communicate with said cylindrical volume within the cylindrically arcuate fraction which is beneath said bottom wall, and in which said bottom wall has separate port openings for passage of each of the respective cables from its entry port to its storage volume.

15. The splice case of claim 12, in which retaining-flange means extends radially inward from the upper edge of each side wall, to an extent sufficiently short of said core wall to permit cable entry into said annular storage volume in the space between said flange means and said core wall.

16. The splice case of claim 12, in which retaining-flange means extends radially inward from the upper edge of said core wall and sufficiently short of closure of said oval storage volume to permit cable entry into said oval storage volume.

17. The splice case of claim 12, in which the minimum inside radius of said core wall is at least substantially five times the diameter of the involved fiber-optic cable.

* * * * *